United States Patent [19]

Zhevelev et al.

[11] Patent Number: 5,936,524

[45] Date of Patent: Aug. 10, 1999

[54] INTRUSION DETECTOR

[75] Inventors: Boris Zhevelev, Rishon Lezion; Mark Moldavski, Petah Tikva, both of Israel

[73] Assignee: Visonic Ltd., Tel Aviv, Israel

[21] Appl. No.: 08/907,470

[22] Filed: Aug. 8, 1997

Related U.S. Application Data

[63] Continuation-in-part of application No. 08/641,854, May 2, 1996, abandoned.

[51] Int. Cl.$^6$ .................................................. G08B 13/18
[52] U.S. Cl. ........................ 340/552; 340/522; 340/521; 342/28; 342/53
[58] Field of Search ..................................... 340/552, 522, 340/521, 553, 554, 565, 507, 567; 342/28, 53

[56] References Cited

U.S. PATENT DOCUMENTS

| | | | |
|---|---|---|---|
| 3,719,812 | 3/1973 | Bishop et al. | 364/579 |
| 3,792,470 | 2/1974 | Donovan et al. | 340/515 |
| 3,801,978 | 4/1974 | Gershberg et al. | 340/516 |
| 4,605,922 | 8/1986 | Blattman et al. | 340/552 |
| 4,611,197 | 9/1986 | Sansky | 340/522 |
| 4,660,024 | 4/1987 | McMaster | 340/522 |
| 5,077,548 | 12/1991 | Dipoala | 340/522 |
| 5,093,656 | 3/1992 | Dipoala | 340/522 |
| 5,150,127 | 9/1992 | Aw | 342/169 |
| 5,287,111 | 2/1994 | Shpater | 342/28 |
| 5,416,487 | 5/1995 | Hampson | 342/53 |
| 5,450,062 | 9/1995 | DiPoala | 340/552 |
| 5,491,467 | 2/1996 | Tracy et al. | 340/522 |

Primary Examiner—Jeffery A. Mofsass
Assistant Examiner—Benjamin C. Lee
Attorney, Agent, or Firm—Ladas & Parry

[57] ABSTRACT

A method for determining malfunction of a microwave intrusion detector which transmits microwave radiation into a region and receives microwave radiation to produce a receiver signal, such that a detection pattern of microwave pulses is transmitted periodically during an intrusion detection mode, including initiating a self-test mode of the detector, transmitting during the self-test mode a test pattern comprising a plurality of microwave pulses having at least two different duty cycles, different from the detection pattern, receiving microwave radiation in the self-test mode and generating a receiver signal responsive thereto and analyzing the receiver signal to derive a parameter responsive to the test pattern, so as to determine a malfunction condition.

51 Claims, 15 Drawing Sheets

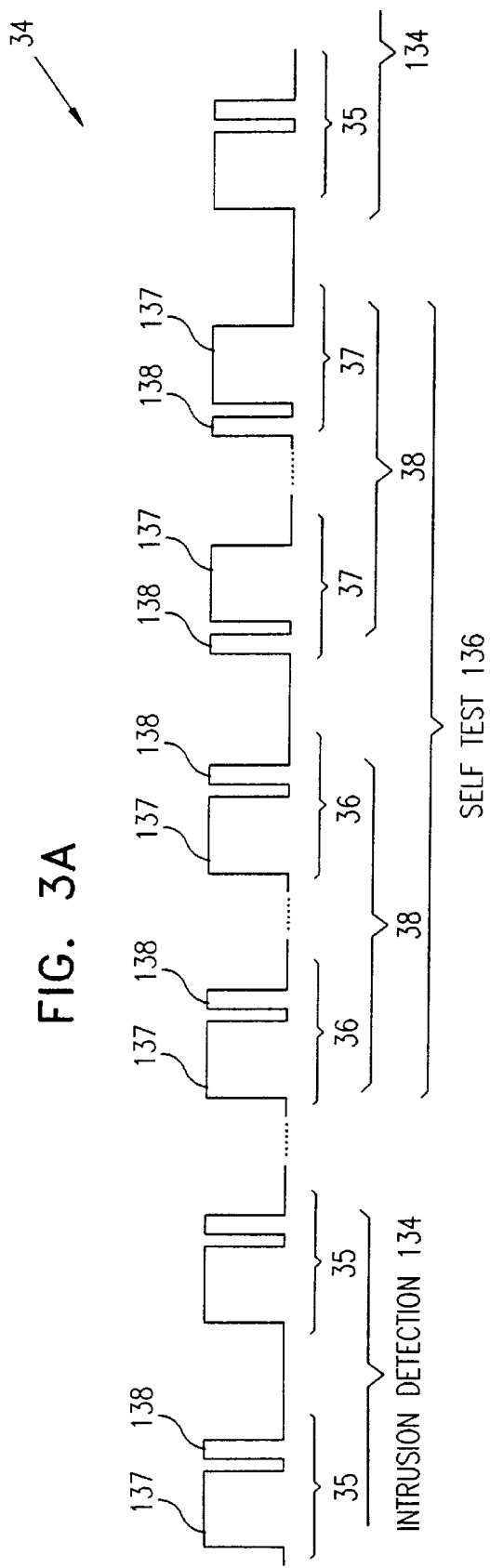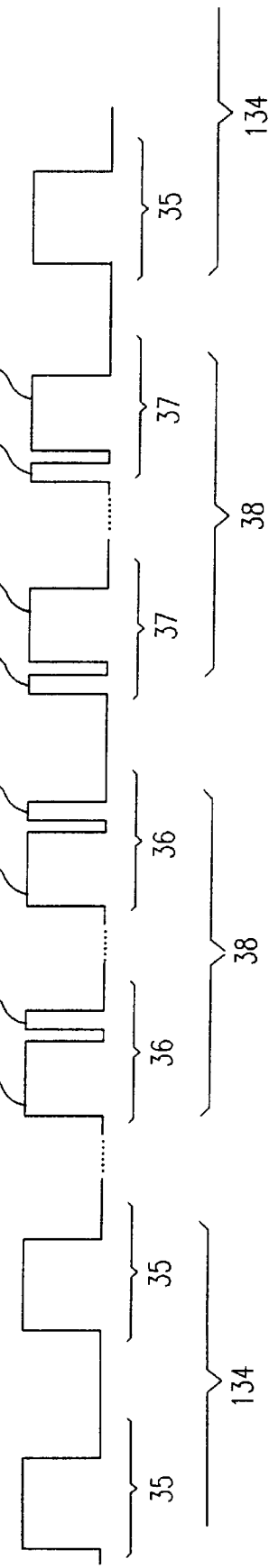

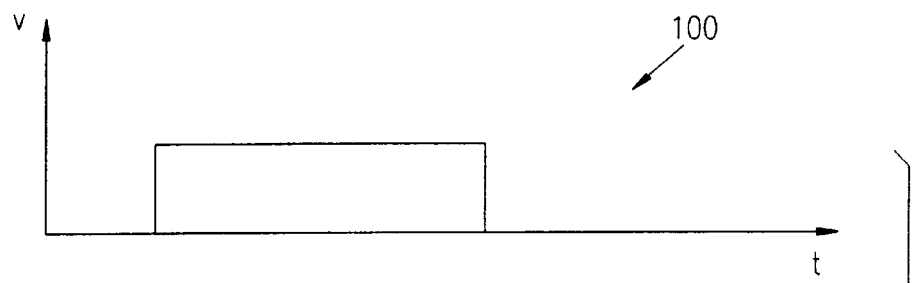
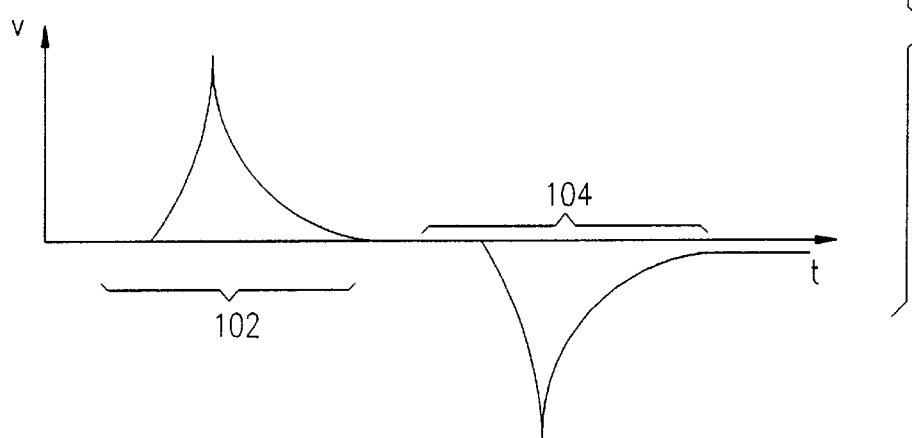
FIG. 10
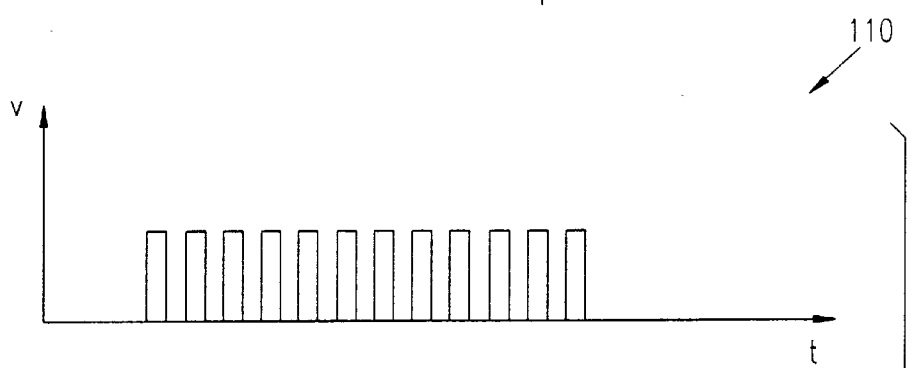
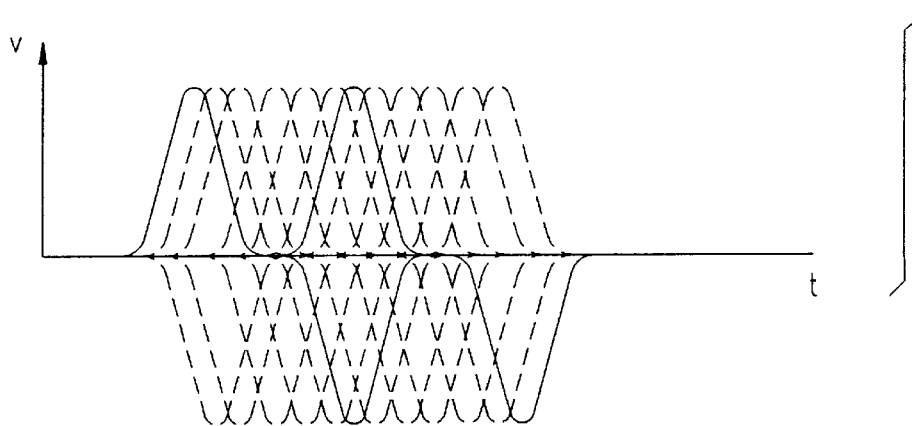
FIG. 11

INTRUSION DETECTOR

RELATED APPLICATION

This application is a continuation-in-part of U.S. patent application Ser. No. 08/641,854, now abandoned, filed on May 2, 1996.

FIELD OF THE INVENTION

The present invention relates to intrusion detectors in general and, more particularly, to an improved microwave detector and to a combined microwave/passive infrared intrusion detector.

BACKGROUND OF THE INVENTION

Microwave radiation detectors are widely used in intrusion detection systems, e.g. burglar alarm systems. A typical microwave detector includes a microwave transmitter which transmits microwave energy, typically microwave energy at a frequency on the order of 10 GHz, into a supervised region such as a room, and a microwave receiver which receives microwave energy reflected from the region. The transmitted microwave energy may be continuous or pulsed with a constant duty cycle, for example a duty cycle on the order of 1:100. The receiver provides an electric output responsive to changes in certain parameters, e.g. frequency, of the microwave radiation. The receiver output is amplified and processed to determine whether or not changes in the reflected radiation, such as frequency shifts, indicate an intrusion situation. If the amplified receiver output meets predetermined criteria, an intrusion alarm or some other indication is activated.

It should be noted that microwave intrusion detection is generally based on detection of changes of the received signal parameters and is generally not dependent on the absolute values of the received signal parameters. Therefore, for example, when no changes are detected in the received signal parameters, the detection system will generally not detect an intrusion.

It is well known that the diodes used in the transmitters and/or receivers of existing microwave detectors, e.g. Gunn-type diodes, are susceptible to manufacture/maintenance/handling effects, such as relatively low-level electrostatic discharge, as well as to natural effects such as changes in temperature and/or humidity. Thus, many existing microwave detection systems include auto-supervision, i.e. self-test, devices and/or modes of operation.

Techniques for supervising and monitoring microwave alarm systems are described, for example, in U.S. Pat. No. 5,093,656 and U.S. Pat. No. 5,287,111. The U.S. Pat. No. 5,287,111 Patent describes a microwave detection system in which the average energy of the transmitted microwave signal is varied periodically in order to self-test the detection system. The average energy is varied by changing the amplitude, duty cycle and/or pulse width of the signal. Sensor monitoring techniques for microwave and/or other intrusion detection systems are also described in U.S. Pat. No. 4,611,197.

Intrusion detection systems combining two, different, detection technologies such as microwave detection, pyroelectric detection, acoustic detection, etc., are known in the art. For example, U.S. Pat. No. 4,660,024 describes a dual technology intruder detection system including two detection subsystems. The two subsystems use two, respective, detection technologies to detect intrusions within predefined time intervals, whereby intrusion by either subsystem activates a common alarm mechanism. Patent '024 also describes a supervisory circuit for detecting malfunctions in either of the subsystems. When a malfunction is detected in one of the subsystems, the other subsystem remains operable.

Many microwave detection systems, such as dual infrared and microwave systems, include one or more lamps, generally LEDs, which light up periodically for signaling purposes. The LEDs give rise to signals which may be interpreted by the microwave detection system as indicating the presence of an intruder. In order to avoid false alarms, prior art systems ignore signals received during the transition time of the LED, and delay detection until after the transient signal has settled. As a result, such systems may fail to recognize actual intruder motion, for example, if the motion occurs only during the detection delay.

U.S. Pat. No. 5,450,062 which is incorporated herein by reference, suggests switching off the LED for a period substantially longer than a sampling period of the microwave system. This requires a continuous feedback connection between the microwave system and the LEDs.

SUMMARY OF THE INVENTION

It is an object of the present invention to provide an improved method and apparatus for auto-supervision of a microwave intrusion detection system. The supervision method of the present invention is simple to implement and is applicable to most microwave detection systems known in the art, including dual-technology systems which combine microwave detection with another detection technology, for example a combined microwave—passive infrared intrusion detection.

The present invention can be used on a microwave detector having a transmitter which periodically generates and transmits a super-high-frequency (SHF) wave, a receiver which receives reflections of the SHF wave (and optionally of the transmitted wave) and provides an output signal responsive thereto and signal processing circuitry and/or software which analyzes changes, for example frequency or phase shifts, in the reflected SHF wave as compared to a transmitted wave.

In a self-test mode of operation of the intrusion detector, the transmitter generates a duty-cycle-modulated or pulse-width-modulated transmitted SHF wave, such that during the self-test mode the transmitted wave contains a plurality of different duty cycles or pulse widths. The term "wave" as used in the present patent application and in the claims refers generally to any transmission of electromagnetic radiation, typically comprising a burst of multiple radiation cycles. The SHF wave preferably comprises a pattern of pulses with different intervals between pulses or a pattern of pulses of different widths, or a combination thereof. Preferably, during the self-test mode the SHF wave alternates between two patterns of substantially equal energy at a rate which is within the frequency spectrum of signals typically produced by an intruder, preferably a rate of about 10 Hz. The signal processing circuitry detects changes in the received SHF signal responsive to the change in the transmitted wave.

The self-test mode is preferably activated periodically, for a predetermined time period, during which the signal processing circuitry performs a number of measurements of a parameter related to the duty cycle or pulse width modulation sequences of the received signal, as described below. Preferably, the measurements are performed in substantially the same manner as the measurements performed by the signal processing circuitry during normal intrusion detection mode. A series of such parameter measurements are preferably stored in a memory of the signal processing circuitry. The different parameter measurements are then compared by the processing circuitry, to determine changes in the measured parameter. In one preferred embodiment of the present invention, the parameter related to the duty cycle of the received SHF signal is determined by integrating the received signal over a predefined time interval.

In a preferred embodiment of the invention, a portion of the transmitted wave is received together with the reflected wave. This combined signal is detected and its amplitude is measured. This amplitude will depend, inter alia, on the presence of reflections in the radiation field of the wave and on the phase and frequency differences between the transmitted and reflected waves. It is also dependent on the duty cycle of the detected signal. In this embodiment of the invention, during the self-test mode, variations in the duty cycle should result in a changing measured signal, independent of the presence or absence of reflections, so long as the system is transmitting and the receiver is receiving. Thus, in the self-test mode, a changing received signal indicates that the system is operating reasonably well. On the other hand, the absence of a change in the received signal with change in the wave form of the transmitted waves indicates a serious malfunction in the transmitter, receiver or detector.

Preferably, in the self-test mode the transmitted signal has a constant amplitude, and only the duty cycle or pulse width varies, while the total energy in the transmitted signal remains substantially the same. This technique allows use of simpler circuitry, which does not need to produce amplitude changes for self-testing. Preferably, the transmitted signal during intrusion detection mode is a modulated signal formed of a sequence of pulses of different pre-determined duty cycles or pulse widths. During the self-test mode, the energy of the transmitted signal is not changed. Rather, the order of the pulses is varied sufficiently in order to cause a detectable change in the output of the detector. For example, the sequence during intrusion detection may be ordered in a pulse-width increasing manner, and in the self-test mode the order is reversed and/or alternated. Preferably, the pulse sequence is formed of two pulses, a short pulse and a long pulse, and during self-test their order is reversed and/or alternated, such that the signals are repeatedly transmitted in a first order for a first period of time and in a second order for a second period of time. Alternatively, during the intrusion detection mode an unmodulated signal is transmitted, while in the self-test mode the transmitted signal is modulated, as described above.

Preferably, the detector includes a plurality of LEDs, which are used for indication purposes. The switch-on transitions of the LEDs give rise to a transient signal, which may be interpreted by the microwave system as an intrusion detection. Therefore, when the LEDs are turned on, they are modulated rapidly on and off for short periods, rather than illuminating constantly. As a result, the electrical transients caused by switching on the LEDs are effectively canceled out by opposing transients produced when the LEDs are switched off. Thus, switching the LEDs does not cause false intrusion detection by the microwave detector. It is noted that the present invention enables the LEDs to be operated and switched at any time without concern that such operation will interfere with the intrusion detector.

In accordance with a preferred embodiment of the present invention, there is thus provided a method for determining malfunction of a microwave intrusion detector which transmits microwave radiation into a region and receives microwave radiation to produce a receiver signal, wherein a detection pattern of microwave pulses is transmitted periodically during an intrusion detection mode, including initiating a self-test mode of the detector, transmitting during the self-test mode a test pattern including a plurality of microwave pulses having at least two different duty cycles, different from the detection pattern, receiving microwave radiation in the self-test mode and generating a receiver signal responsive thereto, and analyzing the receiver signal to derive a parameter responsive to the test pattern, so as to determine a malfunction condition.

Preferably, transmitting the test pattern includes transmitting a plurality of pulses of different widths.

Alternatively or additionally, transmitting the test pattern includes transmitting a plurality of pulses at different intervals between pulses.

Further alternatively or additionally, the detection and test patterns have respective energy levels, and wherein transmitting the test pattern includes transmitting a pattern having an average energy level substantially equal to that of the detection pattern.

Preferably transmitting the test pattern includes alternately transmitting a first sequence and a second sequence of pulses.

Further preferably, the first sequence includes a combination of pulses of varying widths in a first sequential order, and wherein transmitting the second sequence includes transmitting substantially the same combination of pulses as the first sequence, in a second, different sequential order.

Preferably, alternately transmitting a first sequence and a second sequence includes transmitting the first sequence repeatedly for a first period and transmitting the second sequence repeatedly for a second period of a duration substantially identical to the duration of the first period.

Further preferably, alternately transmitting a first sequence and a second sequence includes alternately transmitting at a rate of alternation between 5 and 20 Hz.

Preferably, the detection pattern includes a combination of pulses of varying widths in a first sequential order, and transmitting the test pattern includes transmitting a combination of pulses having substantially the same widths as the pulses of the detection pattern, in a second, different sequential order.

Further preferably, transmitting the second pattern in the second sequential order includes transmitting pulses in reversed order relative to the first sequential order.

Preferably, the group of pulses includes a short pulse and a long pulse.

Preferably, analyzing the receiver signal to derive the parameter includes deriving a parameter responsive to an integral of at least one component of the receiver signal over a predefined time interval.

Further preferably, analyzing the receiver signal to derive the parameter includes deriving first and second parameters responsive to respective, different frequency bands of the signal.

Preferably, analyzing the receiver signal includes comparing first time intervals in which the first parameter exceeds a first predetermined threshold to a second time interval in which the second parameter exceeds a second predetermined threshold.

There is also provided in accordance with a preferred embodiment of the present invention, a method for determining malfunction of a microwave intrusion detector which transmits microwave radiation into a region and receives microwave radiation to produce a receiver signal, wherein a detection pattern of microwave pulses having an average energy level is transmitted periodically during an intrusion detection mode, including:

initiating a self-test mode of the detector;

transmitting during the self-test mode a test pattern different from the detection pattern including a plurality of microwave pulses having an average energy level substantially equal to that of the detection pattern;

receiving microwave radiation in the self-test mode and generating a receiver signal responsive thereto; and analyzing the receiver signal to derive a parameter responsive to the test pattern, so as to determine a malfunction condition.

Preferably, the detection pattern includes pulses having a first pulse width and wherein transmitting the test pattern includes transmitting pulses having a second pulse width different from the first pulse width.

Alternatively, the detection pattern includes pulses having a first interval between pulses and wherein transmitting the test pattern includes transmitting pulses having a second interval between pulses different from the first interval.

Preferably, the detection pattern includes pulses having a first amplitude and wherein transmitting the test pattern includes transmitting pulses having a second amplitude different from the first amplitude.

Preferably, analyzing the receiver signal to derive the parameter includes deriving a parameter responsive to an integral of at least one component of the receiver signal over a predefined time interval.

Preferably, analyzing the receiver signal to derive the parameter includes deriving first and second parameters responsive to respective, different frequency bands of the signal.

Preferably, analyzing the receiver signal includes comparing first time intervals in which the first parameter exceeds a first predetermined threshold to a second time interval in which the second parameter exceeds a second predetermined threshold.

There is further provided in accordance with a preferred embodiment of the present invention, an intrusion detector for supervising a region including:

a transmitter which transmits microwave radiation into the region;

a receiver which receives microwave radiation reflected from the region and provides an output responsive to the reflected microwave radiation; and a processor which receives the output and detects changes in at least one predefined parameter derived therefrom, the detector having a self-test mode of operation in which the transmitter transmits a duty-cycle-modulated microwave signal, including a plurality of pulses having at least two different duty cycles, and the processor analyzes a variation of the parameter so as to determine a malfunction condition of the detector.

Preferably, the detector has an intrusion detection mode in which the transmitter transmits an intrusion detection signal, and the intrusion detection signal and the duty-cycle-modulated signal comprise substantially equal average energy.

Alternatively, the duty-cycle-modulated signal includes a first sequence repeated for a first duration and a second sequence repeated for a second duration.

Preferably, the first and second durations are substantially equal.

Preferably, the duty-cycle-modulated signal includes the first and second sequences in alternation, and wherein the first and second durations are substantially equal.

Preferably, the alternation is performed at a rate of about 5 to 20 Hz.

Preferably, the parameter related to the receiver output includes a parameter responsive to an integral of at least one component of the receiver output over a predefined time interval.

Preferably, the at least one component of the receiver output includes a first component and a second component in different, respective frequency bands.

Preferably, the processor compares the time intervals in which the parameter responsive to the first frequency component exceeds a first predetermined threshold to the time intervals in which the parameter responsive to the second frequency component exceeds a second predetermined threshold.

Preferably, the detector includes an infrared sensor which views a plurality of fields-of-view of the region and provides an output responsive to motion of an infrared radiation source between the fields-of-view.

There is also provided in accordance with a preferred embodiment of the present invention, an intrusion detector for supervising a region including:

a transmitter which transmits microwave radiation into the region;

a receiver which receives microwave radiation reflected from the region and provides an output responsive to the reflected microwave radiation; and a processor which receives the output and detects changes in at least one predefined parameter derived therefrom, the detector having an intrusion detection mode in which the transmitter transmits an intrusion detection signal and a self-test mode of operation in which the transmitter transmits a self-test signal different from the intrusion detection signal, both signals including substantially the same average energy per unit time, and wherein the processor analyzes a variation of the parameter so as to determine a malfunction condition of the detector.

Preferably, the parameter related to the receiver output includes a parameter responsive to an integral of at least one component of the receiver output over a predefined time interval.

Preferably, the at least one component of the receiver output includes a first component and a second component in different, respective frequency bands.

Preferably, the processor compares the time intervals in which the parameter responsive to the first frequency component exceeds a first predetermined threshold to the time intervals in which the parameter responsive to the second frequency component exceeds a second predetermined threshold.

Preferably the detector includes an infrared sensor which views a plurality of fields-of-view of the region and provides an output responsive to motion of an infrared radiation source between the fields-of-view.

Preferably, the detection signal includes pulses having a first pulse width and wherein the self-test signal includes pulses having a second pulse width different from the first pulse width.

Preferably, the detection signal includes pulses having a first interval between pulses and wherein the self-test signal includes pulses having a second interval between pulses different from the first interval.

Preferably, the detection signal includes pulses having a first amplitude and wherein the self-test signal includes pulses having a second amplitude different from the first amplitude.

There is also provided in accordance with a preferred embodiment of the present invention, a receiver which receives microwave radiation reflected from the region and provides an output responsive to the reflected microwave radiation, an indicator lamp, and a lamp driver circuit, which switches the lamp on and off at a sufficiently high frequency so that switching transients produced by the lamp do not substantially affect the output of the receiver.

Preferably, the receiver continues to provide the output while the circuit is switching the lamp, without substantial interruption of supervision of the region.

Preferably, the circuit switches the lamp on for a first period between about 200 and 800 microseconds.

Preferably, the first period is about 500 microseconds.

Preferably, the circuit switches the lamp off for a second period between about 20 and 200 microseconds.

Preferably, the switching transients include positive and negative transients, which substantially mutually cancel out.

Preferably, the lamp includes a LED.

There is also provided in accordance with a preferred embodiment of the present invention, a method of illuminating an indicator lamp in an intrusion detector, including:

switching the lamp repetitively on and off at a sufficiently high frequency so that the switching has substantially no effect on the detector.

Preferably, the detector periodically transmits and receives microwave energy and wherein switching the lamp includes switching the lamp substantially independent of the periods of transmission of the detector.

Preferably, switching the lamp includes switching the lamp without substantial interruption of supervision of the region.

Preferably, switching the lamp includes switching the lamp on for a first period of about 500 microseconds and switching the lamp off for a second period between about 20 and 50 microseconds.

Preferably, switching the lamp includes switching the lamp such as to generate positive and negative transients, which substantially mutually cancel out.

Preferably, switching the lamp includes switching a LED.

BRIEF DESCRIPTION OF THE DRAWINGS

The present invention will be better understood from the following detailed description of preferred embodiments thereof, taken in conjunction with the following drawings in which:

FIG. 3A is a schematic illustration of a microwave signal transmitted by the intrusion detection circuitry of FIG. 2, in accordance with a preferred embodiment of the present invention;

FIG. 3B is a schematic illustration of a microwave signal transmitted by the intrusion detection circuitry of FIG. 2, in accordance with another preferred embodiment of the present invention

FIG. 10 is a schematic illustration of the transient effect of switching-on an indication LED on a microwave detector; and FIG. 11 is a schematic illustration of an operation pattern of an indication LED, in accordance with a preferred embodiment of the present invention.

DETAILED DESCRIPTION OF THE PREFERRED EMBODIMENTS

Figure 1:
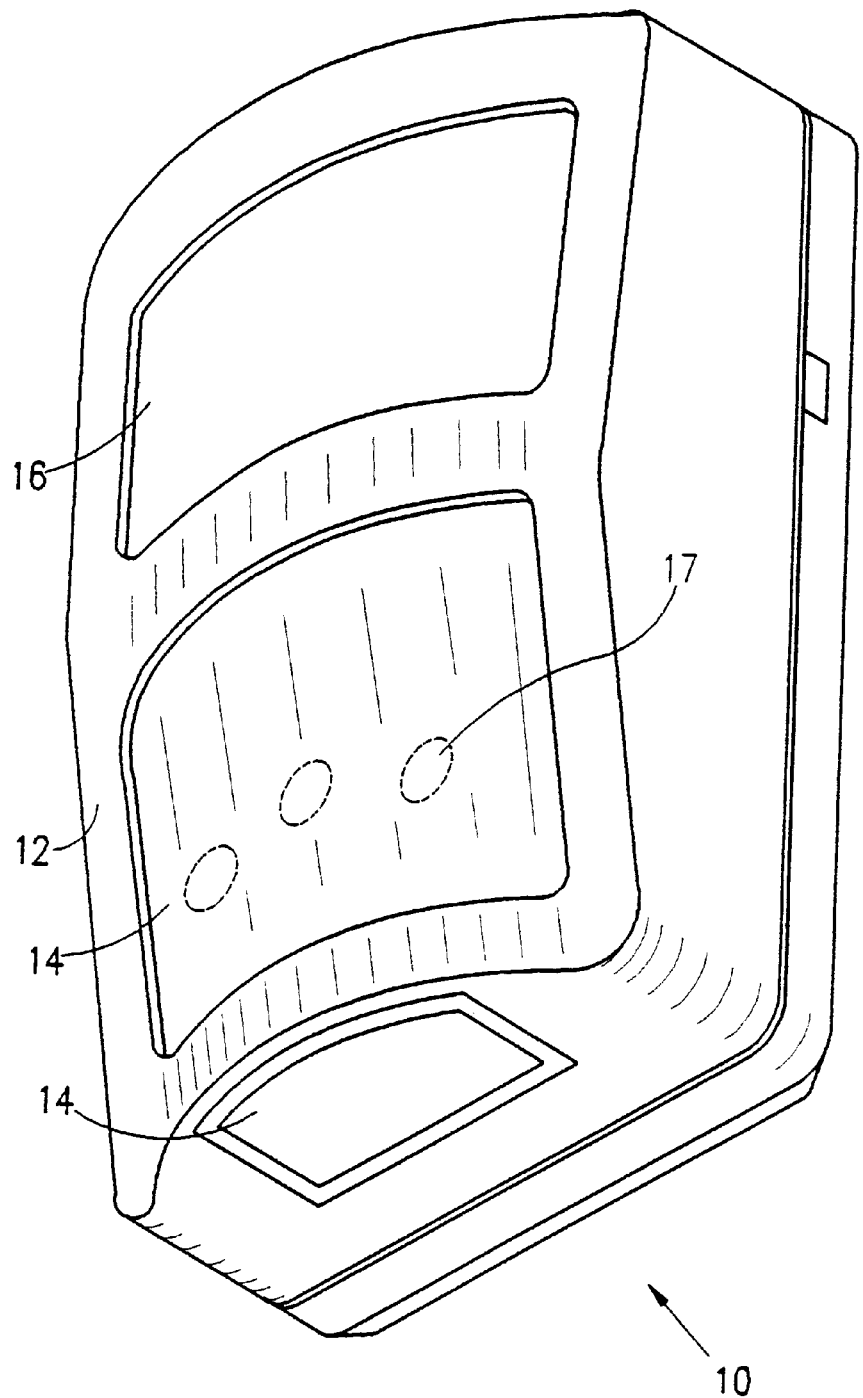
FIG. 1 is a schematic, pictorial illustration of a combined microwave/passive infrared intrusion detector in accordance with a preferred embodiment of the present invention.
Figure 2:
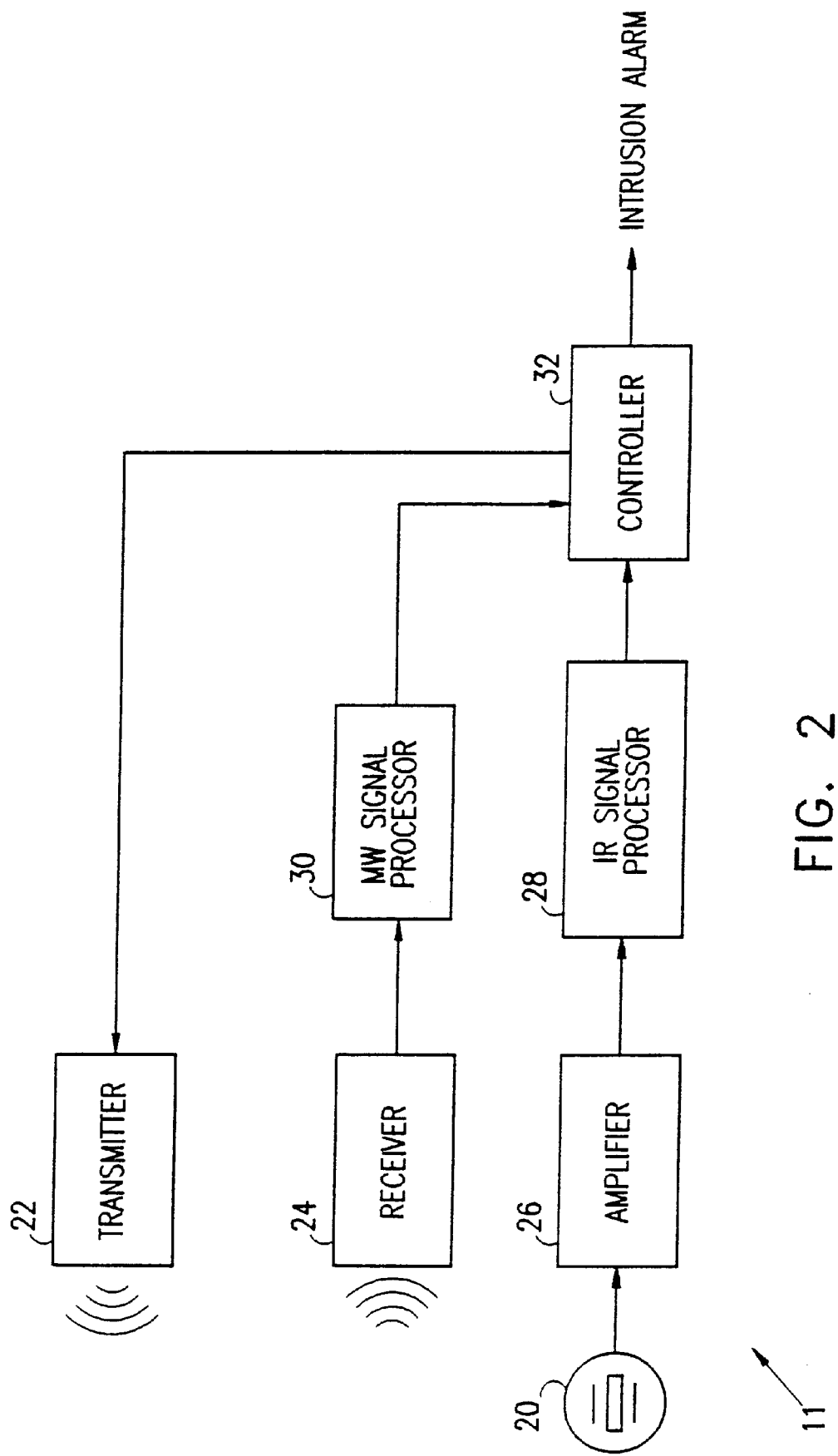
FIG. 2 is a schematic, block diagram, illustrating intrusion detection circuitry in accordance with a preferred embodiment of the present invention.

Reference is now made to FIGS. 1 and 2 which schematically illustrate a combined passive infrared/microwave intrusion detector 10 constructed and operative in accordance with a preferred embodiment of the present invention and preferred intrusion detection circuitry 11 for intrusion detector 10. Detector 10 preferably includes a housing 12 having an infrared transmissive window 14 and a microwave transmissive window 16. As known in the art, window 14 preferably includes segmented optics, such as a segmented Fresnel lens, which provides a segmented field-of-view of a supervised region to a far infrared sensor 20 which is situated in housing 12 at a predetermined position vis-a-vis window 14. Alternatively, window 14 is merely a protective, infrared transparent, window and the segmented field-of-view of the supervised region is provided by an additional optical element, such as a segmented lens or mirror in housing 12. Microwave window 16 may be formed of any material which is transmissive to microwave radiation, preferably super high frequency (SHF) radiation at a frequency on the order of 10 GHz, which is generated into the supervised region by a microwave transmitter 22 in housing 12, as is known in the art. SHF microwave energy which is reflected from the supervised region is preferably received by a microwave receiver 24 in housing 12.

Referring particularly to FIG. 2, circuitry 11 includes a far infrared signal amplifier 26, preferably a band-pass amplifier as is known in the art, which amplifies the output of far infrared sensor 20. The output of amplifier 26 is received by a far-infrared signal processor 28. The output of processor 28, which is responsive to variations in the output of amplifier 26, is connected to an input of a controller 32. As known in the art, when an intruder crosses the segmented field-of-view of sensor 20, the output of amplifier 26 changes and, when the changes meet predetermined criteria, processor 28 generates an infrared intrusion detection signal to controller 32. An intrusion alarm circuit in controller 32, activated in response to the infrared intrusion detection signal and/or in response to a microwave intrusion detection signal as described below, generates an intrusion alarm output which operates an audible alarm or some other indication, at the supervised region or at a remote monitoring station. In some preferred embodiments of the present invention, the detection of far infrared intruders, using processor 28 and/or any other circuitry or software known in the art, is preferably as described in U.S. patent application Ser. No. 08/643,125, which is assigned to the assignee of the present patent application, and whose disclosure is incorporated herein by reference. However, the present invention is generally not limited to a particular type of infrared detector or to the presence of any such detector.

As further shown in FIG. 2, the output of microwave receiver 24 is preferably received by a microwave signal processor 30. As known in the art, the output of microwave receiver 24, which preferably includes a microwave antenna and a microwave signal amplifier, is responsive to microwave radiation reflected from the supervised region and in a particularly preferred embodiment of the invention, to transmitted radiation which is received by the antenna together with the reflected radiation. The output of microwave signal processor 30, which is preferably responsive to variations in the output of receiver 24, is connected to an input of controller 32. When an intruder crosses the region supervised by detector 10, the output of receiver 24 changes and, if the changes meet predetermined criteria, processor 28 generates a microwave intrusion detection signal to controller 32.

In a preferred embodiment of the invention, receiver 24, processor 30 and controller 32 are operative to detect motion of the intruder by determining variations in a frequency and/or phase difference between the transmitted and received radiation. To this end, signal processor 30 provides a signal which is responsive to the amplitude of the combined radiation received by receiver 24, which amplitude is sensitive to both the frequency difference and changing phase difference between the transmitted and reflected radiation.

In response to the microwave intrusion detection signal and/or in response to the infrared intrusion detection signal generated by processor 28, the intrusion alarm circuit of controller 32 is activated to generate an intrusion alarm output as described above.

It should be noted that in at least some preferred embodiments of the present invention, microwave signal processor 30 and far infrared signal processor 28 are combined into a single processing unit (not shown in the drawings), which carries out the functions of both processors 28 and 30 as described herein. It should be appreciated that when such a combined processing unit is used, some elements of the combined unit may execute both infrared and microwave detection functions.

According to preferred embodiments of the present invention, microwave signal processor 30 further includes circuitry and or software for supervising the operation of the other elements of circuitry 11 of detector 10. In a preferred embodiment of the present invention, controller 32 periodically switches microwave transmitter 22 from an intrusion detection mode of operation, in which transmitter 22 transmits a microwave signal having a first pulse pattern, preferably with a constant duty cycle or pulse width, to a self-test mode of operation in which transmitter 22 transmits a duty-cycle- or pulse-width-modulated microwave signal having a plurality of pulses with different duty-cycles or pulse widths during the self-test mode. During the intrusion detection mode, microwave and/or far infrared intrusion detection is performed by processors 30 and 28, respectively, as described above.

FIGS. 3A and 3B show microwave signals 34 transmitted during the intrusion detection mode and the self-test mode, in accordance with preferred embodiments of the present invention. Preferably, as shown in FIG. 3A, during the intrusion detection mode, detector 10 periodically transmits a pattern 134 comprising a first pulse sequence 35, which includes a plurality of pulses of different pulse widths, such as a long pulse 137 and a short pulse 138. Alternatively, pulse sequence 35 comprises a single pulse as shown in FIG. 3B.

During the self-test mode, the detector transmits a self test pattern 136, preferably comprising alternate iterations of a second pulse sequence 36 and a third pulse sequence 37. Preferably, pulse sequences 35, 36 and 37 have substantially the same energy and are transmitted at constant intervals such that the average transmission energy is constant. Use of pulses having the same amount of energy simplifies the detection system.

Preferably, sequences 35, 36 and 37 comprise different permutations of the same combination of pulses, wherein only the order of the pulses is changed from one sequence to another. Further preferably, sequence 36 is substantially identical to sequence 35, and sequence 37 comprises the pulses of sequence 36 in reverse order, such that short pulse 138 precedes long pulse 137.

Preferably, in the self-test mode sequences 36 and 37 are transmitted alternately, such that each sequence is transmitted for a duration 38 before the other sequence is transmitted. Preferably, duration 38 is between about 50 and 200 msec, most preferably about 100 msec. The alternation of sequences 36 and 37 causes spikes at the frequency of alternation, i.e., at about 5 to 20 Hz. These spikes have frequencies normally associated with intruders, and therefore, when the system is operating properly, the spikes are identified by the detection system as an intrusion.

The width of pulse 137 may be expressed as a value $\Delta_1=D-d$, and the width of pulse 138 may be expressed as $\Delta_2=D+d$, wherein both D and d are predetermined constants. Thus, the alternation of the order of pulses 137 and 138 can be achieved by applying one logical negation operation. In forming pulse sequence 36, the pulse width is set to be $D\pm d$, and the sign of d alternates. In forming pulse sequence 37, an additional negation is applied to d, thus requiring minimal circuitry to apply the self test operation.

During the self-test mode, in which the supervising circuit and/or software in processor 30 is activated, processor 30 produces a signal responsive to the waveform of the transmitted wave, irrespective of the presence of reflected radiation. Preferably, the amplitude of the signal varies with changes in the waveform. In the self-test mode, as the waveform is changed, the variation in amplitude of the processor output signal is measured. If the signal variation corresponds to the expected variations within predetermined error bounds, the transmitter, receiver and detector, are presumed to be operating correctly. Preferably, the expected variations are similar to the variations caused by an intruder during the intrusion detection mode. If the variation is outside such bounds, an error condition is assumed to exist, and processor 30 generates a malfunction detection signal to controller 32. Based on the malfunction detection signal, controller 32 provides an output which activates a sensible indication of the malfunction, such as a buzzer or a LED illumination.

Alternatively, in accordance with another preferred embodiment of the present invention, in the detection mode, detector 10 periodically transmits a first pulse such that the transmitted wave has a predetermined average energy. During the self-test mode, detector 10 periodically transmits a second pulse having a shape different than the first pulse, but with substantially the same predetermined average energy. For example, the first pulse may have a high amplitude and a short pulse width, while the second pulse has a lower amplitude and a larger pulse width. Alternatively, the second pulse may have the higher amplitude. Further alternatively, the interval between the pulses may vary between the self-test mode and the detection mode together with either the amplitude or pulse width or both, as long as the average energy remains substantially constant.

In a preferred embodiment of the invention, processor 30 preferably integrates the output of receiver 24 and detects changes in the integral of the receiver output for both detection and self-test modes. In each case, the determination of the signal strength is based on the integrated signal.

Figure 4:
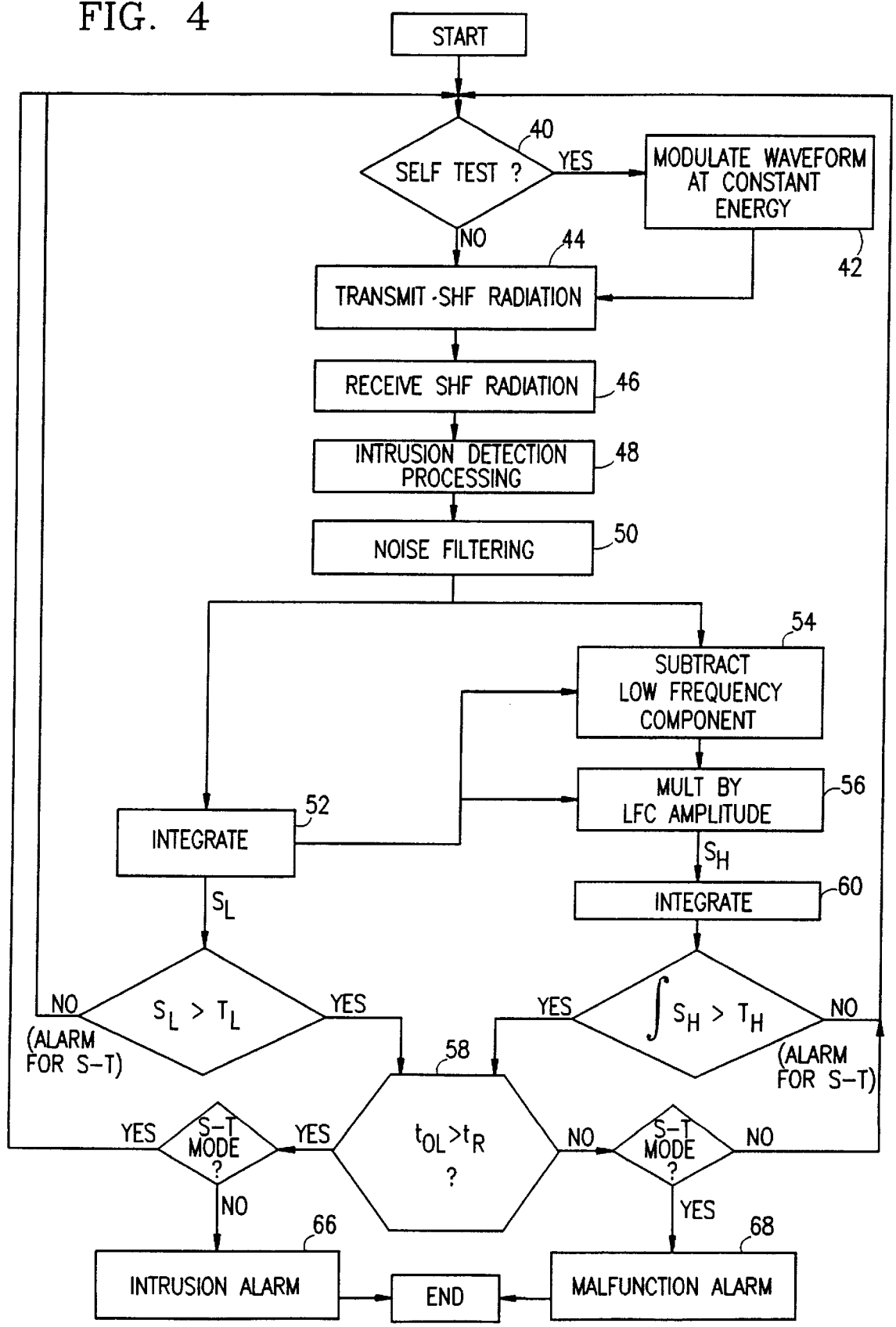
FIG. 4 is a schematic flow chart of a preferred algorithm for intrusion detection which may be carried out by the circuitry of FIG. 2.

Reference is now made to FIG. 4 which is a schematic flow chart of a self-test algorithm executed by microwave processor 30, in accordance with a preferred embodiment of the present invention. The self-test mode of processor 30 is periodically activated, as indicated at block 40, for example by a timer circuit or based on a manual user control. In a preferred embodiment of the invention, the self-test mode is activated automatically every 60 minutes, for a period of 1–3 seconds. When the self-test mode is activated, processor 30 generates a self-test signal to controller 32 which, as indicated at block 42, modulates the waveform of the SHF energy to be transmitted by transmitter 22. For example, if the SHF signal in the intrusion detection mode is a pulsed signal having a constant duty cycle, D, the corresponding SHF signal generated in the self-test mode may be a pulsed signal having an alternating wave form which alternates between sequences of pulses of the values D−d and D+d, as shown above in FIG. 3B.

It should be noted that parameter d may be selected arbitrarily, provided that the resultant alternation of the SHF signal generated by the receiver can be detected using the detection procedure described herein. The duty cycle of the pulsed SHF signal may be modulated, for example, by modulating the time intervals between pulses and/or by modulating the width of the pulses.

As indicated at block 44, transmitter 22 transmits a detection mode wave, for example, wave 136 shown in FIG. 3B, or a self-test mode wave, for example, wave 134, depending on whether or not the self-test mode is activated, into the supervised region. Reflections of the SHF wave from the supervised region (and preferably a portion of the transmitted wave) are then received by receiver 24, as indicated at block 46, which produces an output signal responsive to the received wave. As indicated at block 48, the output of receiver 24 is processed by intrusion detection circuitry or software in processor 30, to detect frequency and/or phase shifts or any other parameter changes in the SHF reflections. The processed signal is then filtered, as indicated at block 50, to reduce noise such as noise generated by an electric grid. The filtered signal is then processed in two lines, namely a low frequency detection line on the left and a high frequency detection line on the right.

In the low frequency line, the signal is integrated, as indicated at 52 over a suitable period, to produce a signal, $S_L$ which reflects low frequency components in the received signal. Preferably the integration period is of the length of the self-test mode, for example between about 1 and 3 seconds. Alternatively, a suitable ballistic integration may be performed. This low frequency component is used to modify the filtered signal in the high frequency line to produce a high frequency signal.

As indicated at box 54 the low frequency component is subtracted from the filtered signal. This subtracted signal is then multiplied by the instantaneous amplitude of the low frequency signal, as indicated at box 56 to generate a high frequency signal $S_H$. A determination as to the presence of this signal is preferably made based on its integral, taken over a period of 0.5 to 2 seconds, preferably between 0.8 and 1.5 seconds, most preferably about 1 second.

Figure 5:
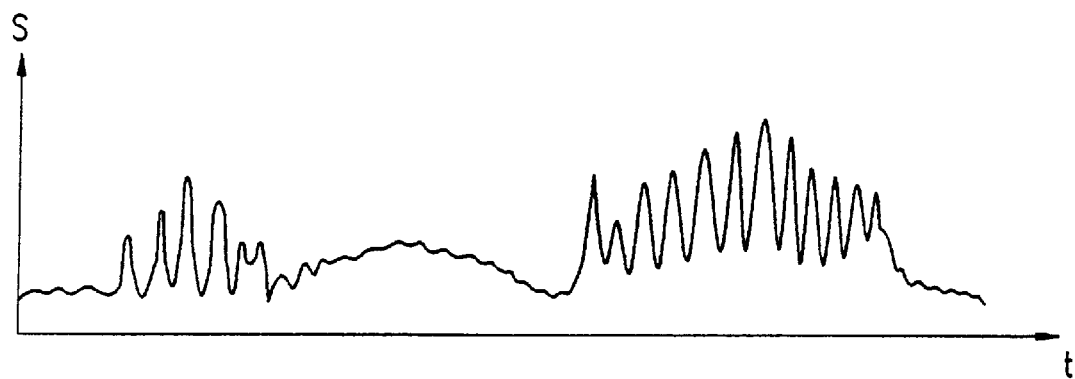
FIG. 5 is a schematic illustration of a typical microwave detection signal received by the intrusion detection circuitry of FIG. 2.

Reference is made to FIG. 5 which schematically illustrates a typical received microwave signal, labeled S in the intruder detection mode.

Figure 6A:
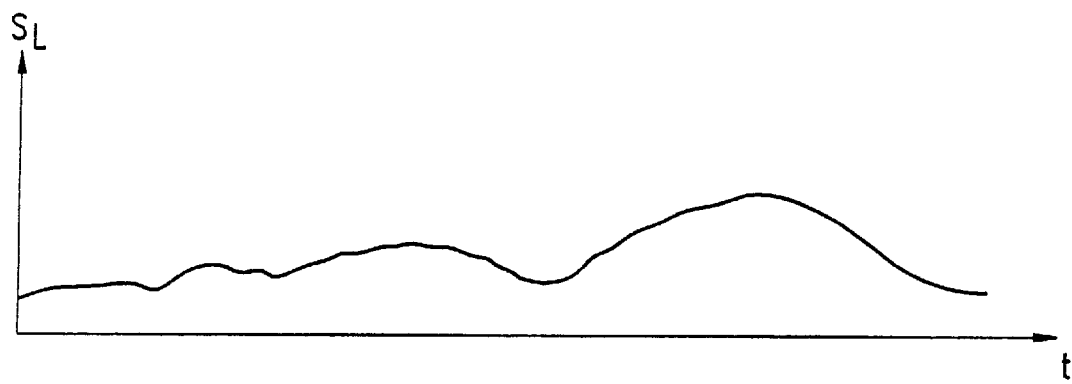
FIGS. 6A and 6B are schematic illustrations of a low frequency component and a high frequency component, respectively, of the microwave detection signal of FIG. 5.
Figure 6B:
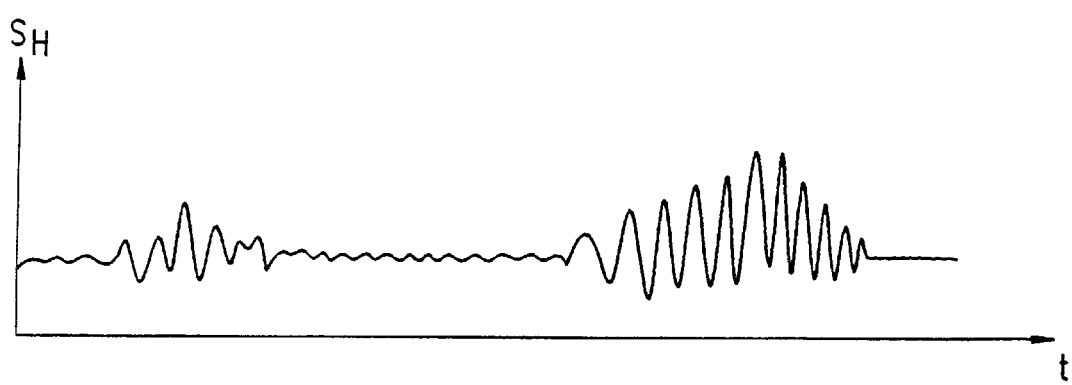

In accordance with a preferred embodiment of the invention, as described above and further described here, the low frequency component, $S_L$, shown in FIG. 6A and the high frequency component $S_H$, shown in FIG. 6B are derived from S. While the methodology illustrated in FIG. 4 is preferred for generating the high and low frequency components of the microwave signal, any other suitable method for determining these components, as is known in the art, is suitable for many aspects of the invention.

$S_L$ and (the integral of) $S_H$, respectively are compared to predetermined thresholds, $T_L$ and $T_H$, respectively. If the low frequency component does not exceed threshold $T_L$ and/or if the high frequency component (integral) does not exceed threshold $T_H$, the self-test procedure is terminated and a malfunction alarm is indicated. If both components exceed their respective thresholds, processor 30 proceeds to compare the components $S_L$ and the integral of $S_H$, as indicated at block 58 and described below. In the intrusion detection mode of the system, this condition indicates that there is no intruder.

Figure 7A:
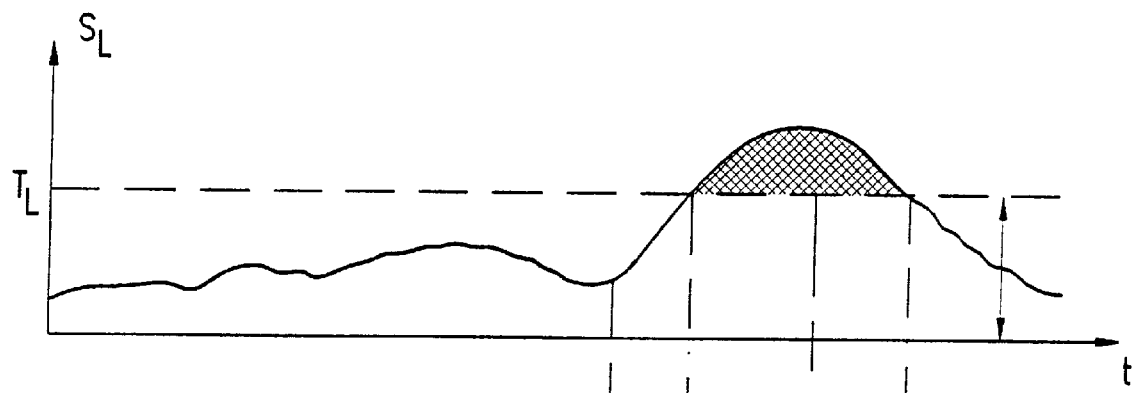
FIGS. 7A and 7B are schematic illustrations of the time integrals of the low frequency component of FIG. 6A and the high frequency component of FIG. 6B, respectively.
Figure 7B:
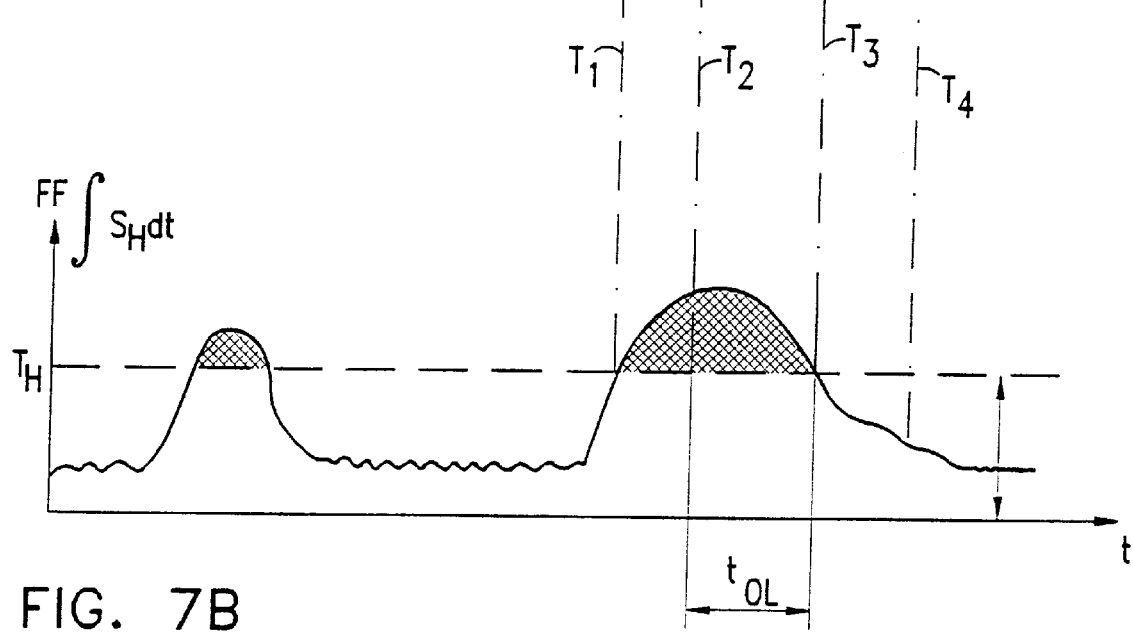

Reference is made to FIGS. 7A and 7B which schematically illustrate the component $S_L$ and the integral of component $S_H$, respectively. As shown in FIG. 7A, the component $S_L$ exceeds threshold $T_L$ between times $t_2$ and $t_4$, hereinafter referred to as the low excess interval. As shown in FIG. 7B, the integral of component $S_H$ exceeds threshold $T_H$ between times $t_1$ and $t_3$, hereinafter referred to as the high excess interval. Thus, in the example of FIGS. 7A and 7B, the overlap between the low excess interval and the high excess interval, $t_{OL}=t_3-t_2$, is greater than zero. In general, the low excess intervals and the high excess intervals do not necessarily overlap. For example, on the left hand side of FIG. 7B, the high frequency integral has a high excess interval while the low frequency signal does not have a corresponding low excess interval.

In a preferred embodiment of the present invention, processor 30 compares the overlap time, $t_{OL}$, between the low excess interval and the high excess interval, to a predetermined minimum reference interval, $t_R$, as indicated at block 58. If the overlap time is shorter than the reference interval, i.e. if $t_{OL} \leq t_R$, and the detector is in the self-test mode of operation, processor 30 generates a malfunction alarm signal to controller 32, as indicated at block 68. If the overlap time is longer than the reference interval, i.e. if $t_{OL} > t_R$, and the detector is in the self-test mode of operation, the malfunction alarm is not activated and the detection procedure is resumed at block 40. If the overlap time is longer than the reference interval and the detector is in the intrusion detection mode of operation, processor 30 generates an intrusion detection signal, as indicated at block 66, depending on the results of the intrusion detection processing at block 48. If the overlap time is shorter than the reference interval and the detector is in the intrusion detection mode of operation, neither the malfunction alarm nor the intrusion alarm are activated and the detection procedure is resumed at block 40.

Figure 8A:
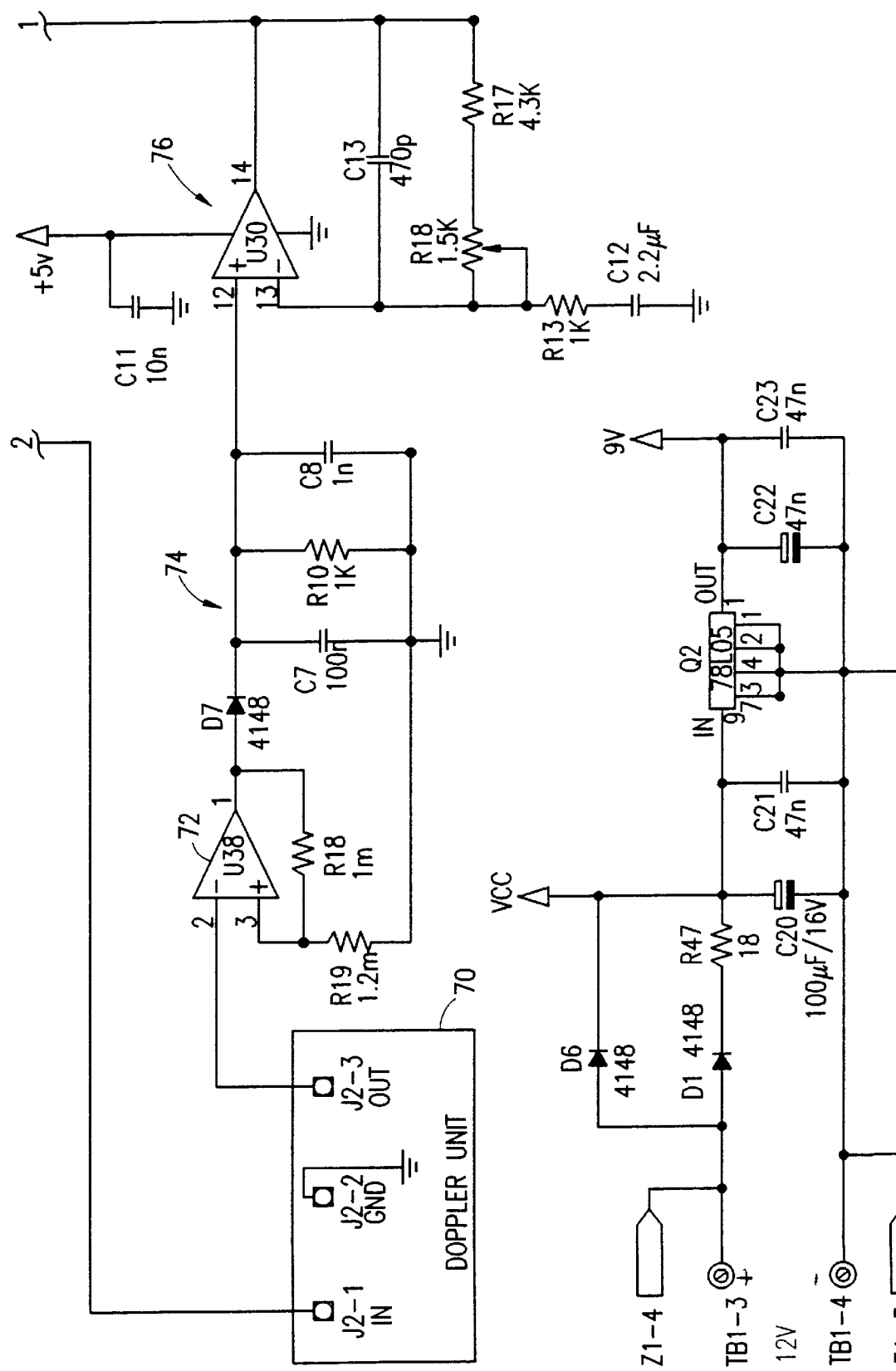
FIGS. 8A–8C are detailed schematic diagrams of circuitry for far infrared/microwave intrusion detection in accordance with one, preferred, embodiment of the present invention.
Figure 8B:
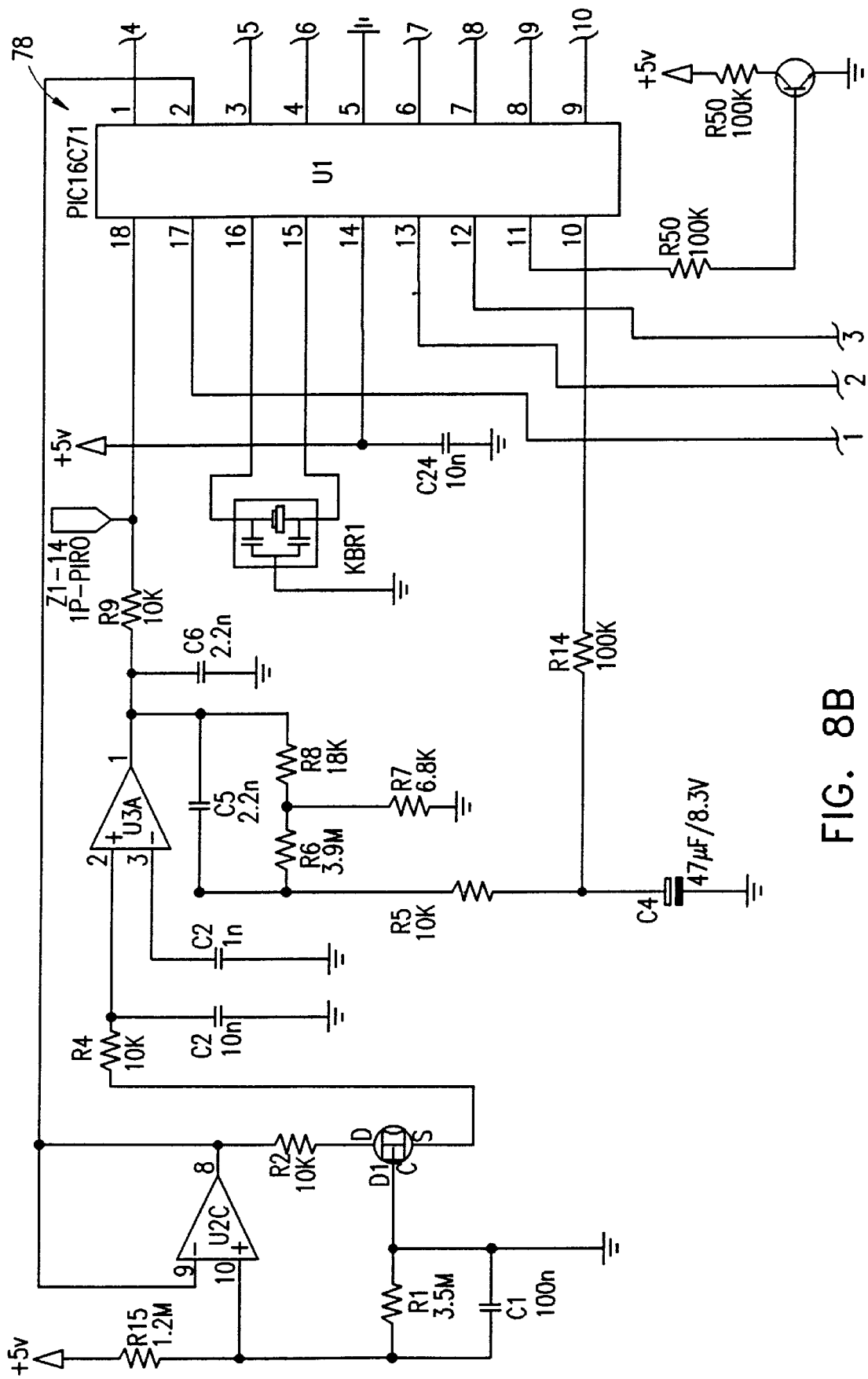
Figure 8C:
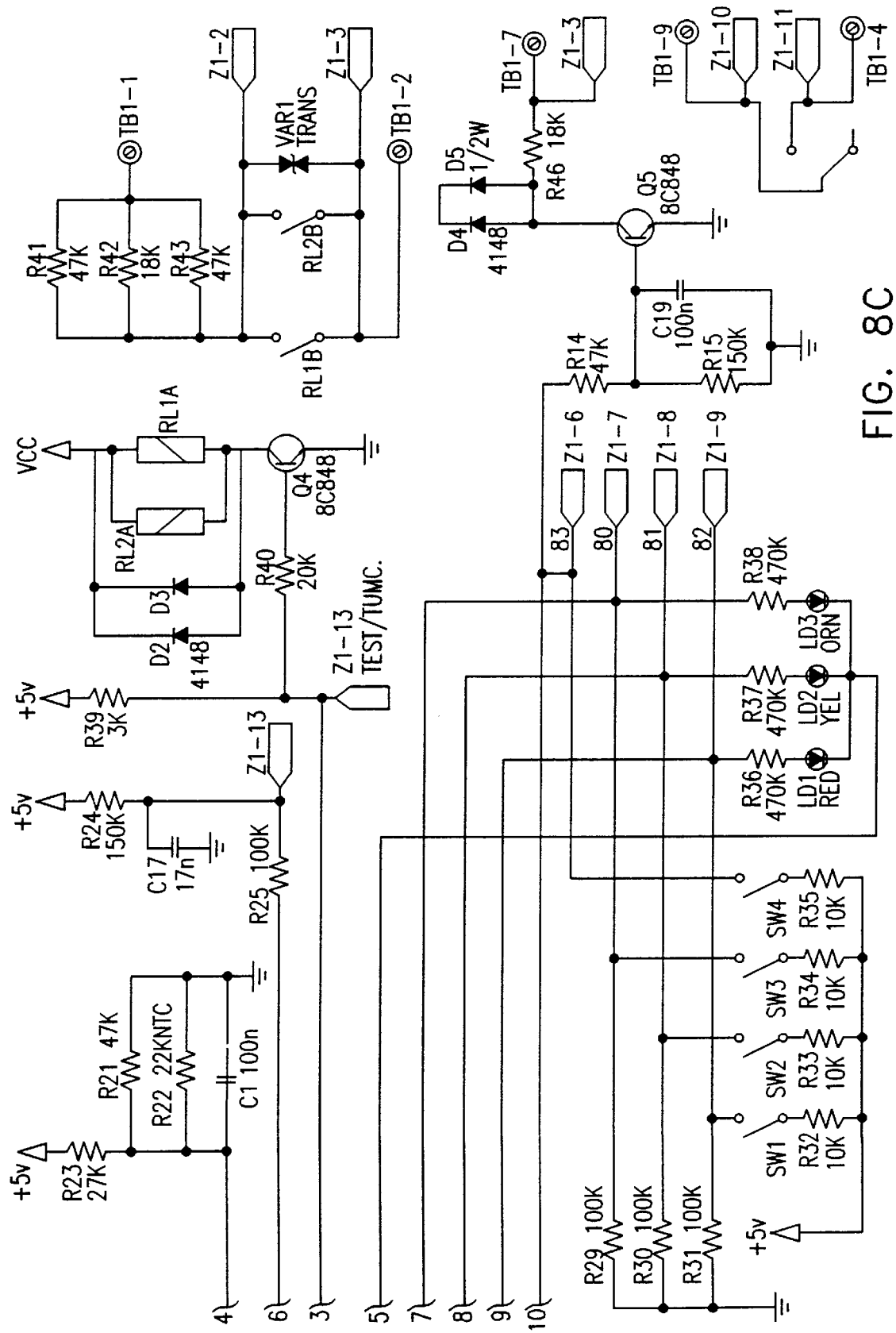

Reference is now made to FIGS. 8A–8C which are detailed diagrams of the circuitry used for combined far infrared/microwave intrusion detection in accordance with a preferred embodiment of the present invention.

FIG. 8A shows a Doppler unit 70 which includes a transmitter antenna and the receiver antenna. The signals generated by the receiver antenna, which, in the preferred mode of operation includes the effect of both transmitted and reflected waves, is amplified by an amplifier 72 and detected by a detector 74. The detected signal is amplified by amplifier 76 and fed to processor 78 (FIG. 8B), which corresponds to a portion of controller 32 of FIG. 2, for processing as described above.

Figure 9A:
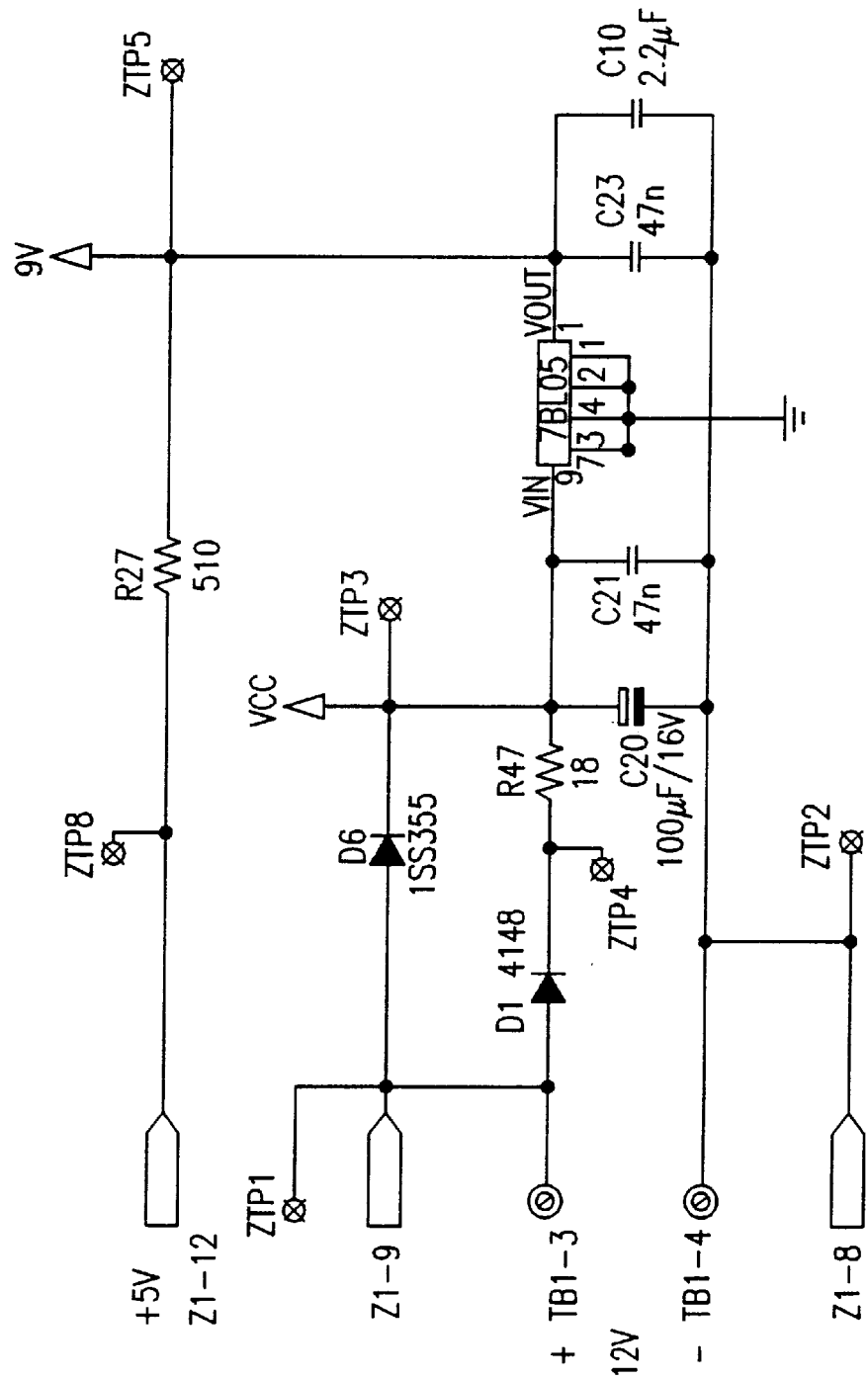
FIG. 9A–9E are detailed schematic diagrams of circuitry for far infrared/microwave intrusion detection in accordance with another preferred embodiment of the present invention.
Figure 9B:
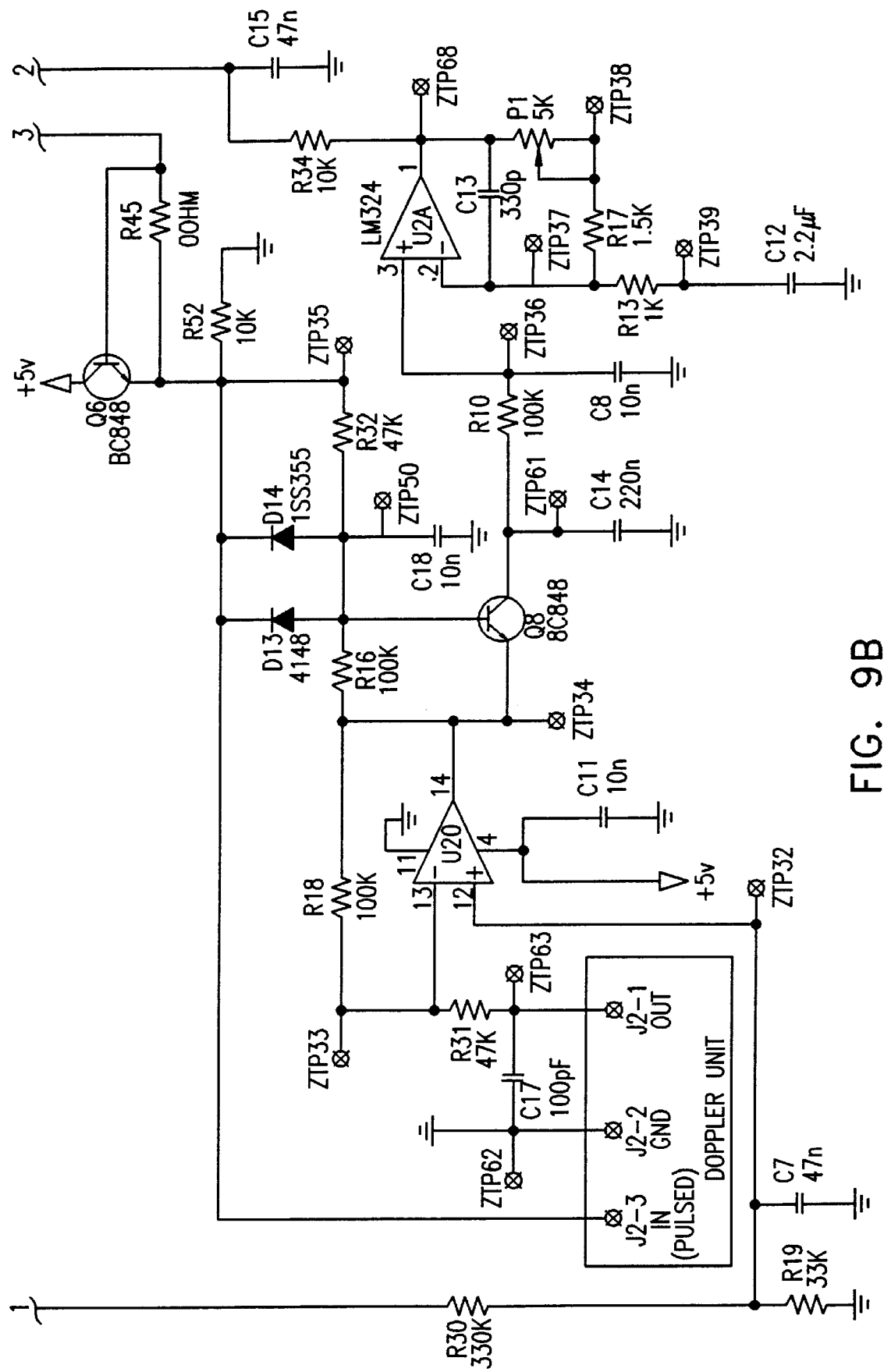
Figure 9C:
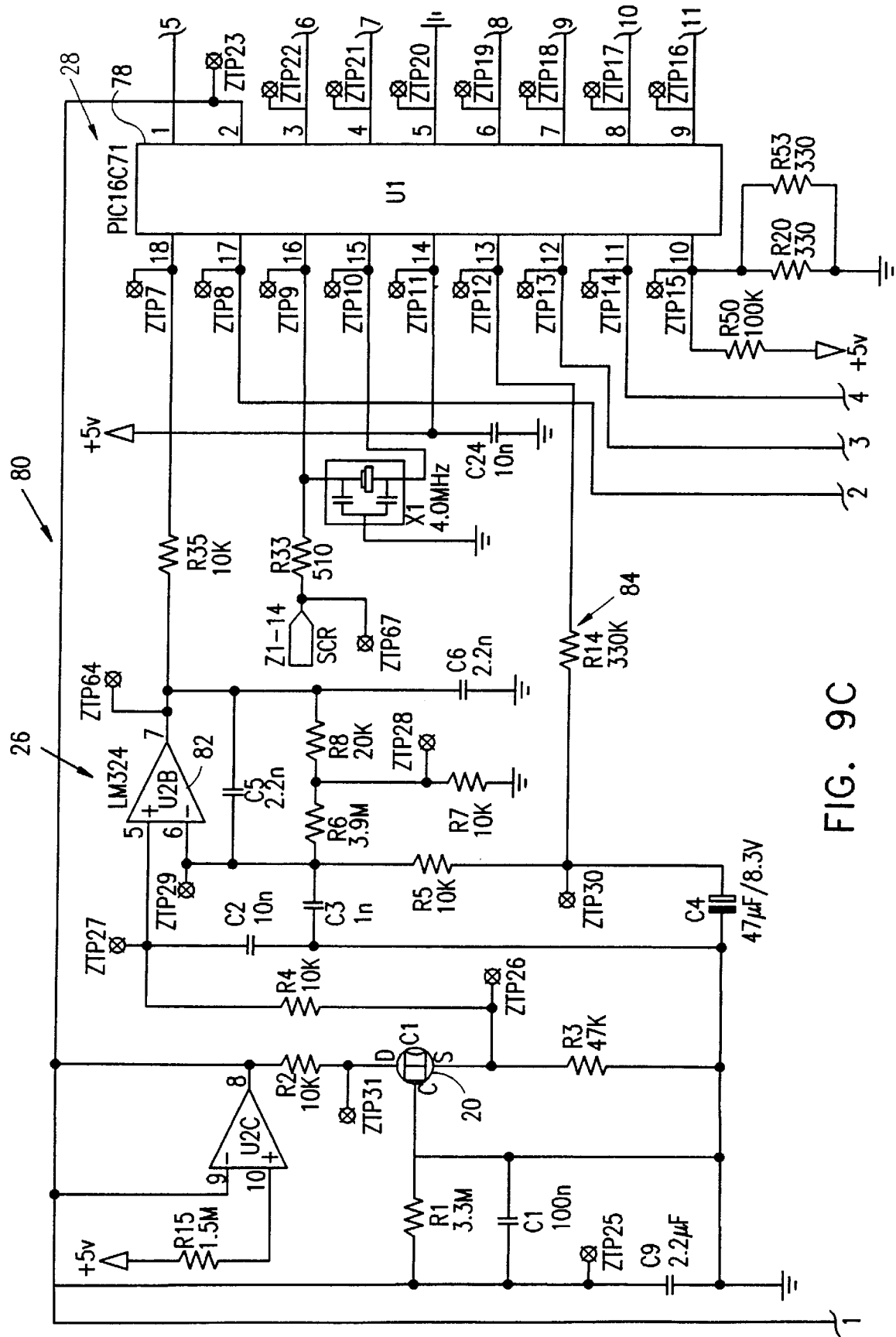
Figure 9D:
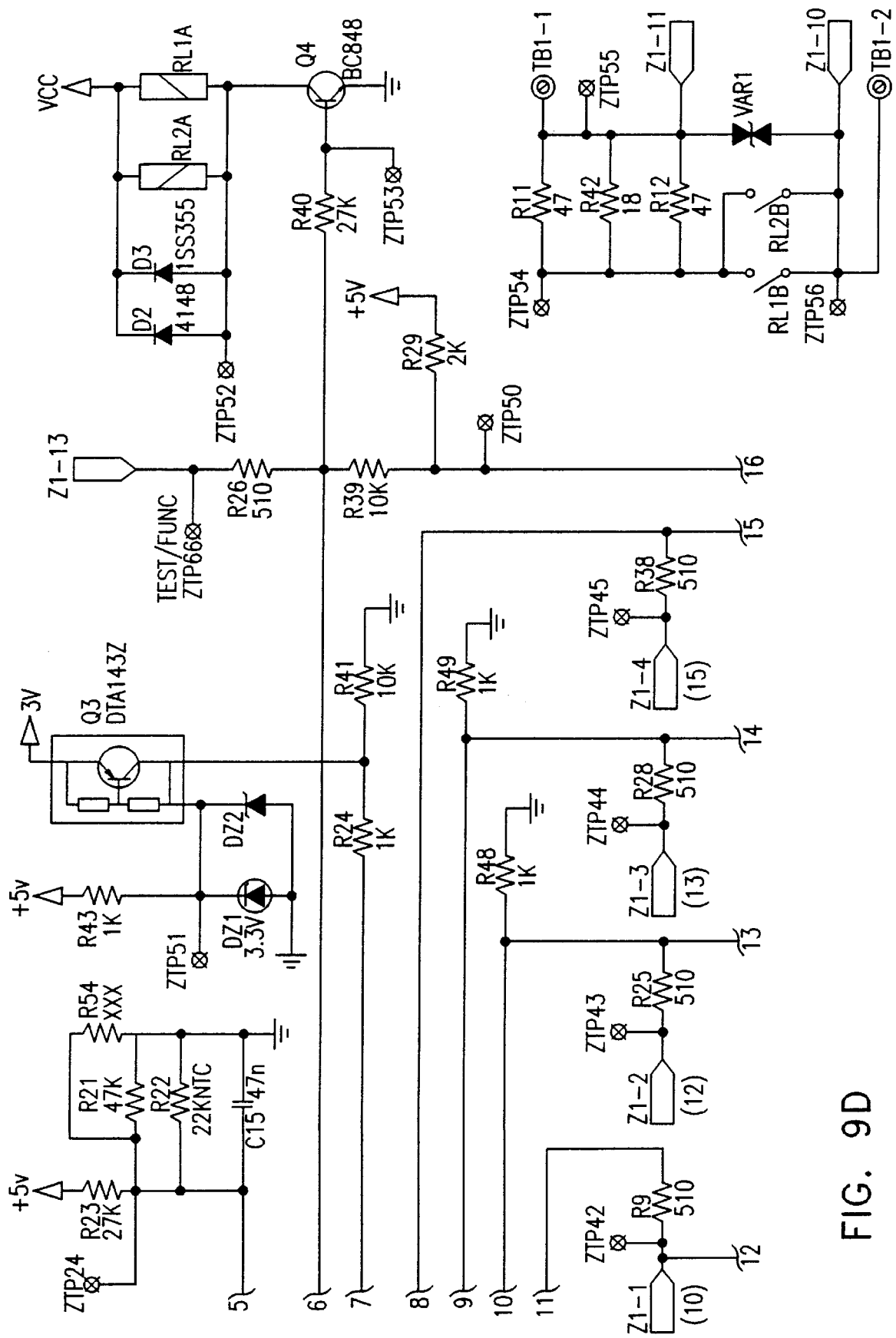
Figure 9E:
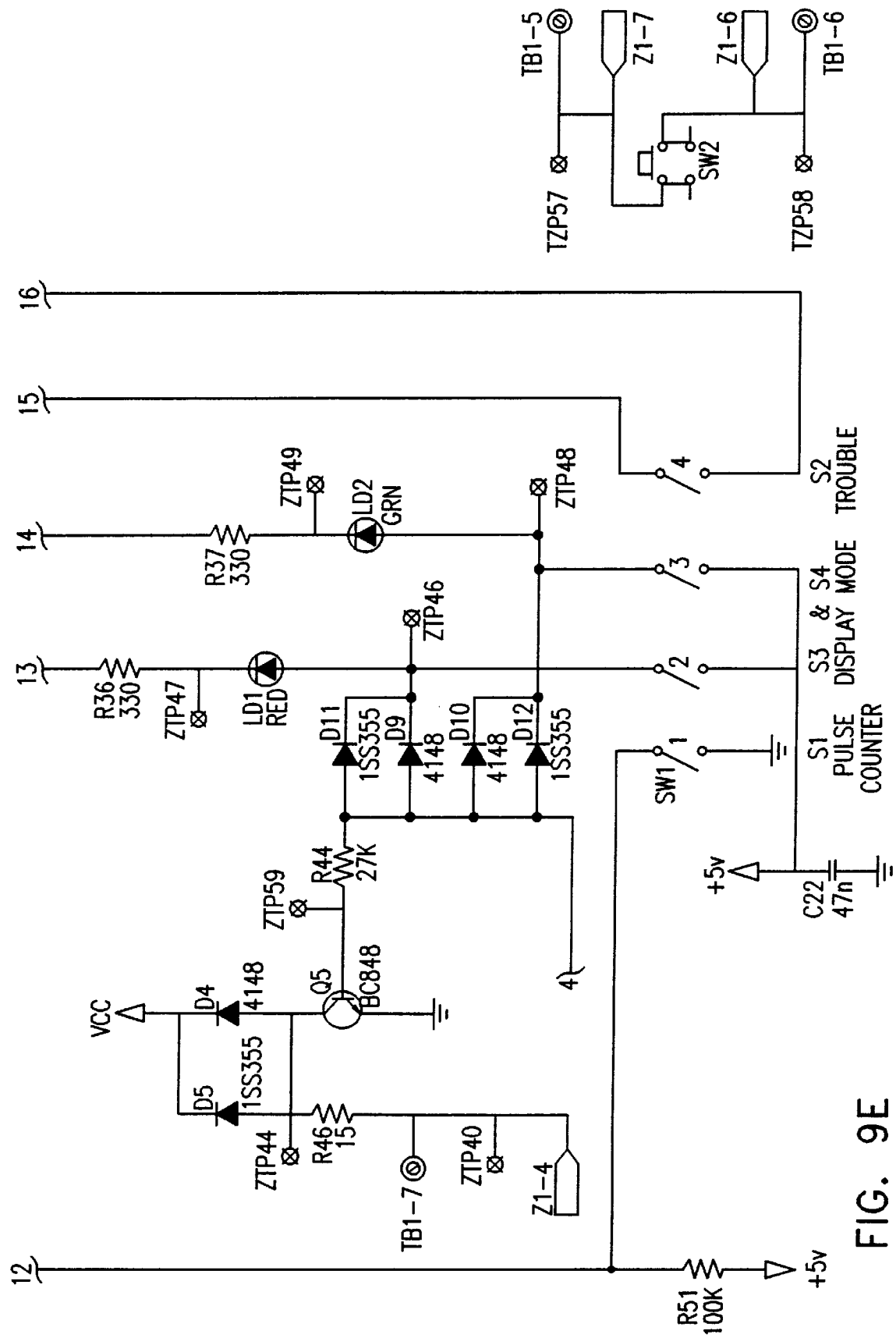

FIGS. 9A–9E are detailed diagrams of the circuitry used for combined far infrared/microwave intrusion detection, in accordance with another preferred embodiment of the present invention. As shown in FIG. 9C, the intrusion detection circuitry includes an IR processing circuit 80 which includes IR detector 20, amplifier 26 and processor 28, shown in the block diagram of FIG. 2. (In the embodiment of FIGS. 9A–9D, microcontroller 78 performs the functions of both of blocks 28 and 32 shown in FIG. 2.) In FIG. 9C IR signal amplifier 26 includes only a single stage, high gain amplifier 82. Use of only one amplifier allows simpler and cheaper production of the detector. However, when only one amplifier is used, the warm-up time necessary to load capacitor C4 and stabilize the detector is long, normally between about 5 and 7 minutes. During this time the detector does not operate properly.

To overcome this problem, a feedback connection 84 is preferably made from leg 13 of processor 78 to capacitor C4. Leg 13 is set to charge the capacitor to a suitable level, so that a desired, stable input value is received at leg 13 of the processor. Preferably, when the detector is operated feedback connection 84 has a resistance of about between 100k and 500k, most preferably 330k. This connection allows quick charge-up of capacitor C4 and reduces the warm-up time to about 20–30 seconds, required for stabilization.

As can be seen in FIG. 1, at least one LED 17 which serves for signaling is preferably included in intrusion detector 10. LED 17 is used for various purposes, such as signaling operation of and/or detection by the intrusion detector, and may be switched on for various lengths of time. In a preferred embodiment of the present invention, when LED 17 is switched on, it does not operate continuously, but rather operates periodically at a rate fast enough so that a human eye does not perceive the transitions, for reasons now to be described.

FIG. 10 illustrates the effect of the operation of LED 17 on a microwave detector, such as receiver 24, when the LED is turned on and off responsive to an extended, square-wave voltage signal 100, as is known in the art. At the rising edge of signal 100, LED 17 has a transient effect of transmitting microwave radiation, in a pattern such as signal 102. At the falling edge of signal 100, LED 17 emits a transient microwave signal 104 of opposite polarity. Signals 102 and 104 may have a duration as long as about 300 milliseconds, which could be misinterpreted by the detector as a moving person.

FIG. 11 shows a voltage signal 110 applied to LED 17, in accordance with a preferred embodiment of the present invention. In order to overcome the problem of the above-described transient effect of switching the LED, pattern 110 comprises a plurality of pulses having a width of between about 200 and 800 microseconds, preferably about 500 microseconds. Preferably, all the pulses have the same width. The intervals between the pulses, in which the LED is not operated, are preferably about 20–200 microseconds.

Thus, as shown in the lower graph in FIG. 11, the positive and negative transient microwave radiation components from the LED substantially cancel out and are not detected as an intrusion by the detector.

Detailed algorithms for carrying out certain aspects of the present invention are disclosed in the attached Appendix, labeled "Appendix A". The algorithms in Appendix A, which form part of the disclosure of the present invention, are included herein as part of the best mode of carrying out the present invention. Although the algorithms disclosed in Appendix A are preferably executed by a digital microprocessor, such as processor 78, using appropriate software, these algorithms may also be implemented in the form of dedicated hardware.

It should be appreciated that the present invention is not limited to what has been thus far described with reference to preferred embodiments of the invention. Rather, the scope of the present invention is limited only by the following claims:

We claim:

1. A method for determining malfunction of a microwave intrusion detector which transmits microwave radiation into a region and receives microwave radiation to produce a receiver signal, wherein a detection pattern of microwave pulses is transmitted periodically during an intrusion detection mode, comprising:

initiating a self-test mode of the detector;

transmitting during the self-test mode a test pattern, different from the detection pattern;

receiving microwave radiation in the self-test mode;

generating a receiver signal responsive thereto; and analyzing the receiver signal to derive a parameter responsive to the test pattern, so as to determine a malfunction condition, wherein:

the detection pattern includes a combination of pulses of varying widths in a first sequential order; and transmitting the test pattern includes transmitting a combination of pulses having substantially the same widths as the pulses of the detection pattern, in a second, different sequential order.

2. A method according to claim 1, wherein transmitting the test pattern comprises transmitting a plurality of pulses of different widths.

3. A method according to claim 1, wherein transmitting the test pattern comprises transmitting a plurality of pulses at different intervals between pulses.

4. A method according to claim 1, wherein the detection and test patterns have respective energy levels, and wherein transmitting the test pattern comprises transmitting a pattern having an average energy level substantially equal to that of the detection pattern.

5. A method according to claim 4, wherein transmitting the test pattern comprises alternately transmitting a first sequence and a second sequence of pulses.

6. A method according to claim 5, wherein the first sequence comprises a combination of pulses of varying widths in a first sequential order, and wherein transmitting the second sequence comprises transmitting substantially the same combination of pulses as the first sequence, in a second, different sequential order.

7. A method according to claim 5, wherein alternately transmitting a first sequence and a second sequence comprises transmitting the first sequence repeatedly for a first period and transmitting the second sequence repeatedly for a second period of a duration substantially identical to the duration of the first period.

8. A method according to claim 7, wherein alternately transmitting a first sequence and a second sequence comprises alternately transmitting at a rate of alternation between 5 and 20 Hz.

9. A method according to claim 1, wherein transmitting the second pattern in the second sequential order comprises transmitting pulses in reversed order relative to the first sequential order.

10. A method according to claim 9, wherein the group of pulses comprises a short pulse and a long pulse.

11. A method according to claim 1, wherein analyzing the receiver signal to derive the parameter comprises deriving a parameter responsive to an integral of at least one component of the receiver signal over a predefined time interval.

12. A method according to claim 11, wherein analyzing the receiver signal to derive the parameter comprises deriving first and second parameters responsive to respective, different frequency bands of the signal.

13. A method according to claim 12, wherein analyzing the receiver signal comprises comparing first time intervals in which the first parameter exceeds a first predetermined threshold to a second time interval in which the second parameter exceeds a second predetermined threshold.

14. A method for determining malfunction of a microwave intrusion detector which transmits microwave radiation into a region and receives microwave radiation to produce a receiver signal, wherein a detection pattern of microwave pulses having an average energy level is transmitted periodically during an intrusion detection mode, including:
   initiating a self-test mode of the detector;
   transmitting during the self-test mode a test pattern different from the detection pattern including a plurality of microwave pulses having an average energy level substantially equal to that of the detection pattern;
   receiving microwave radiation in the self-test mode and generating a receiver signal responsive thereto; and
   analyzing the receiver signal to derive a parameter responsive to the test pattern, so as to determine a malfunction condition, wherein:
      the detection pattern includes a combination of pulses of varying widths in a first sequential order; and
      transmitting the test pattern includes transmitting a combination of pulses having substantially the same widths as the pulses of the detection pattern, in a second, different sequential order.

15. A method according to claim 14, wherein the detection pattern comprises pulses having a first pulse width and wherein transmitting the test pattern comprises transmitting pulses having a second pulse width different from the first pulse width.

16. A method according to claim 14, wherein the detection pattern comprises pulses having a first interval between pulses and wherein transmitting the test pattern comprises transmitting pulses having a second interval between pulses different from the first interval.

17. A method according to claim 14, wherein the detection pattern comprises pulses having a first amplitude and wherein transmitting the test pattern comprises transmitting pulses having a second amplitude different from the first amplitude.

18. A method according to claim 14, wherein analyzing the receiver signal to derive the parameter comprises deriving a parameter responsive to an integral of at least one component of the receiver signal over a predefined time interval.

19. A method according to claim 18, wherein analyzing the receiver signal to derive the parameter comprises deriving first and second parameters responsive to respective, different frequency bands of the signal.

20. A method according to claim 19, wherein analyzing the receiver signal comprises comparing first time intervals in which the first parameter exceeds a first predetermined threshold to a second time interval in which the second parameter exceeds a second predetermined threshold.

21. An intrusion detector for supervising a region including:
   a transmitter which transmits microwave radiation into the region;
   a receiver which receives microwave radiation reflected from the region and provides an output responsive to the reflected microwave radiation; and
   a processor which receives the output and detects changes in at least one predefined parameter derived therefrom,
   the detector having a self-test mode of operation in which the transmitter transmits a modulated microwave signal, including a plurality of pulses having at least two different duty cycles, and the processor analyzes a variation of the parameter so as to determine a malfunction condition of the detector, wherein:
      the microwave radiation includes a detection pattern including combination of pulses of varying widths in a first sequential order; and
      the modulated microwave signal includes a combination of pulses having substantially the same widths as the pulses of the detection pattern, in a second, different sequential order.

22. An intrusion detector according to claim 21, wherein the detector has an intrusion detection mode in which the transmitter transmits an intrusion detection signal, and wherein the intrusion detection signal and the duty-cycle-modulated signal comprise substantially equal average energy.

23. An intrusion detector according to claim 21, wherein the duty-cycle-modulated signal comprises a first sequence repeated for a first duration and a second sequence repeated for a second duration.

24. An intrusion detector according to claim 23, wherein the first and second durations are substantially equal.

25. An intrusion detector according to claim 24, wherein the duty-cycle-modulated signal comprises the first and second sequences in alternation, and wherein the first and second durations are substantially equal.

26. An intrusion detector according to claim 25, wherein the alternation is performed at a rate of about 5 to 20 Hz.

27. An intrusion detector according to claim 21, wherein the parameter related to the receiver output comprises a parameter responsive to an integral of at least one component of the receiver output over a predefined time interval.

28. An intrusion detector according to claim 27, wherein the at least one component of the receiver output comprises a first component and a second component in different, respective frequency bands.

29. An intrusion detector according to claim 28, wherein the processor compares the time intervals in which the parameter responsive to the first frequency component exceeds a first predetermined threshold to the time intervals in which the parameter responsive to the second frequency component exceeds a second predetermined threshold.

30. An intrusion detector according to claim 21 and comprising:
   an infrared sensor which views a plurality of fields-of-view of the region and provides an output responsive to motion of an infrared radiation source between the fields-of-view.

31. An intrusion detector for supervising a region including:

a transmitter which transmits microwave radiation into the region;

a receiver which receives microwave radiation reflected from the region and provides an output responsive to the reflected microwave radiation; and a processor which receives the output and detects changes in at least one predefined parameter derived therefrom, the detector having an intrusion detection mode in which the transmitter transmits an intrusion detection signal and a self-test mode of operation in which the transmitter transmits a self-test signal different from the intrusion detection signal, both signals including substantially the same average energy per unit time, and wherein the processor analyzes a variation of the parameter so as to determine a malfunction condition of the detector, wherein:

the microwave radiation includes a detection pattern including a combination of pulses of varying widths in a first sequential order; and the modulated microwave signal includes a combination of pulses having substantially the same widths as the pulses of the detection pattern, in a second, different sequential order.

32. An intrusion detector according to claim 31, wherein the parameter related to the receiver output comprises a parameter responsive to an integral of at least one component of the receiver output over a predefined time interval.

33. An intrusion detector according to claim 32, wherein the at least one component of the receiver output comprises a first component and a second component in different, respective frequency bands.

34. An intrusion detector according to claim 31, wherein the processor compares the time intervals in which the parameter responsive to the first frequency component exceeds a first predetermined threshold to the time intervals in which the parameter responsive to the second frequency component exceeds a second predetermined threshold.

35. An intrusion detector according to claim 31 and comprising:

an infrared sensor which views a plurality of fields-of-view of the region and provides an output responsive to motion of an infrared radiation source between the fields-of-view.

36. An intrusion detector according to claim 31, wherein the detection signal comprises pulses having a first pulse width and wherein the self-test signal comprises pulses having a second pulse width different from the first pulse width.

37. An intrusion detector according to claim 31, wherein the detection signal comprises pulses having a first interval between pulses and wherein the self-test signal comprises pulses having a second interval between pulses different from the first interval.

38. An intrusion detector according to claim 31, wherein the detection signal comprises pulses having a first amplitude and wherein the self-test signal comprises pulses having a second amplitude different from the first amplitude.

39. An intrusion detector for supervising a region, comprising:

a receiver which receives microwave radiation reflected from the region and provides an output responsive to the reflected microwave radiation;

an indicator lamp; and a lamp driver circuit, which switches the lamp on and off at a sufficiently high frequency so that switching transients produced by the lamp do not substantially affect the output of the receiver.

40. The detector of claim 39, wherein the receiver continues to provide the output while the circuit is switching the lamp, without substantial interruption of supervision of the region.

41. The intrusion detector of claim 39, wherein the circuit switches the lamp on for a first period between about 200 and 800 microseconds.

42. The intrusion detector of claim 41, wherein the first period is about 500 microseconds.

43. The intrusion detector of claim 42, wherein the circuit switches the lamp off for a second period between about 20 and 200 microseconds.

44. The intrusion detector of claim 39, wherein the switching transients comprise positive and negative transients, which substantially mutually cancel out.

45. The intrusion detector of claim 39, wherein the lamp comprises a LED.

46. A method of illuminating an indicator lamp in an intrusion detector, comprising:

switching the lamp repetitively on and off at a sufficiently high frequency so that the switching has substantially no effect on the detector.

47. The method of claim 46, wherein th e detector periodically transmits and receives microwave energy and wherein switching the lamp comprises switching the lamp substantially independent of the periods of transmission of the detector.

48. The method of claim 46, wherein switching the lamp comprises switching the lamp without substantial interruption of supervision of the region.

49. The method of claim 46, wherein switching the lamp comprises switching the lamp on for a first period of about 500 microseconds and switching the lamp off for a second period between about 20 and 50 microseconds.

50. The method of claim 46, wherein switching the lamp comprises switching the lamp such as to generate positive and negative transients, which substantially mutually cancel out.

51. The method of claim 46, wherein switching the lamp comprises switching a LED.

* * * * *